Figure 1:
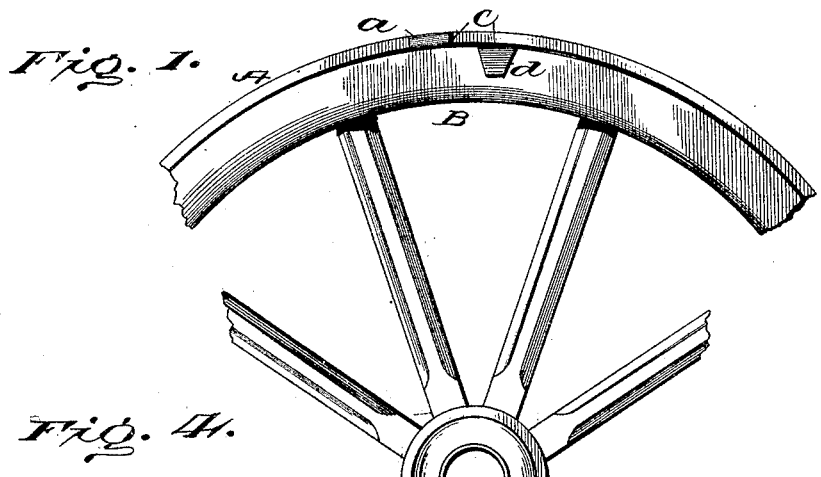

No. 622,591. Patented Apr. 4, 1899.
H. H. BALTZLEY.
TIRE TIGHTENER.
(Application filed Oct. 18, 1898.)

(No Model.)

Witnesses

Inventor
Henry H. Baltzley
by R. S. & A. B. Lacey
his Attorneys

UNITED STATES PATENT OFFICE.

HENRY H. BALTZLEY, OF ASSUMPTION, ILLINOIS, ASSIGNOR OF ONE-HALF TO CHARLES S. CLARK, OF SAME PLACE.

TIRE-TIGHTENER.

SPECIFICATION forming part of Letters Patent No. 622,591, dated April 4, 1899.

Application filed October 18, 1898. Serial No. 693,905. (No model.)

*To all whom it may concern:*

Be it known that I, HENRY H. BALTZLEY, a citizen of the United States, residing at Assumption, in the county of Christian and State of Illinois, have invented certain new and useful Improvements in Tire Tighteners and Holders for Vehicle-Wheels; and I do hereby declare the following to be a full, clear, and exact description of the invention, such as will enable others skilled in the art to which it appertains to make and use the same.

My invention relates to improvements in tire tighteners and holders for vehicle-wheels, and particularly to that class of such devices as are designed to firmly secure the tire against displacement from the rim without necessitating a reduction in the circumference of the tire by cutting, stoving, or other process requiring the services of a skilled mechanic.

The object of my invention is to provide a device of this character which is at once inexpensive of manufacture and efficient in operation.

With this and other objects in view the invention consists of the details of construction to be hereinafter more fully described, and specifically pointed out in the claims.

In the accompanying drawings the same reference characters designate corresponding parts throughout the several views.

Figure 4:
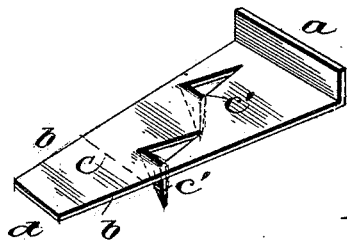
Figure 2:
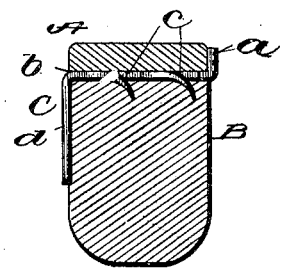
Figure 3:
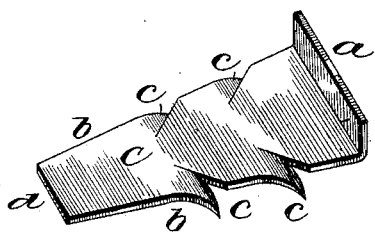

Figure 1 is a side elevation of a section of a vehicle-wheel with my improved tire tightener and holder applied; Fig. 2, a cross-section through the felly, tire, and tightener and holder; Fig. 3, a perspective view of the tightener and holder. Fig. 4 is a detail perspective view of a modification.

Referring now more particularly to the drawings, A represents the tire, and B the felly, of a wheel as commonly constructed for carriages and wagons.

C designates my improved tire tightener and holder, which consists of a sheet-metal plate, preferably wrought-iron, substantially the shape of a truncated triangle and having its widest end turned at a right angle to form a flange $a$.

In either side $b\ b$ of the plate C are cut triangular spurs or barbs $c\ c$, the points of which project at an angle from the plate for a purpose to be hereinafter specified.

As manufactured ready for use my invention appears as shown in Fig. 3, and to apply it to the wheel the narrow end is inserted between the tire and rim and is driven through until the flange $a$, which is upturned, comes in contact with the tire, the said flange extending slightly within the periphery thereof. The barbs $c\ c$, which project downwardly and rearwardly, are embedded in the wood rim when the device is driven to place. When the tightener and holder has thus been driven between the rim and tire, its smaller projecting end $d$ is turned down upon the side of the rim, and when another tightener is driven through from the opposite direction and secured in like manner it will be seen that the tire is held firmly against lateral movement. In Fig. 4 a modification is shown, and the difference resides in forming barbs $c'$ within the body of the tightener or holder C. These barbs $c'$ are adapted to be cut at the time of forming the said holder or tightener and avoid subsequent operations for the same purpose.

When the tighteners are once applied to the wheel, they may remain a permanent fixture thereof. It will of course be understood that there is no need for an expedient of this character except during the summer season, when the wood of the wheel dries and contracts, loosening the tire, yet the tighteners I provide may be left in place permanently without danger of "dishing" the wheel, for the reason that when the wood becomes water-soaked and swells, expanding the rim tightly in the tire, the tighteners will be at once embedded in the rim flush with the periphery thereof.

This device is designed for the primary purpose of providing a means whereby the owner of a vehicle may always have at hand a ready and safe means of securing a loose tire, and a number of the tighteners can be kept with the vehicle at all times for use on the road, thus obviating the annoyance, expense, and delay incident to the ordinary means of retightening.

It will be understood that minor changes may be made in the details of construction of my invention without departing from the spirit thereof or sacrificing any of its advantages.

Having thus described the invention, what is claimed as new is—

1. A tire tightener and holder for vehicle-wheels, comprising a substantially triangular metallic plate provided in its two opposite edges with rearwardly-projecting integral spurs or barbs, and adapted to be inserted between the tire and rim and its ends upset in reverse directions to engage said tire and rim, substantially as described.

2. As a new article of manufacture, a tire tightener and holder for vehicle-wheels, comprising a substantially triangular plate having through two opposite edges cuts or incisions extending at an angle to said edges, substantially as described.

3. A tire tightener and holder for vehicle-wheels consisting of a plate adapted to be inserted between the tire and rim and have its ends upset in reverse directions, and also provided with barbs to engage the said rim.

In testimony whereof I affix my signature in presence of two witnesses.

HENRY H. BALTZLEY.

Witnesses:
  A. H. CORZIN,
  PETER YOUNG.